A. S. MIDDLETON.
SPRING HUB.
APPLICATION FILED NOV. 19, 1919.
1,348,437.
Patented Aug. 3, 1920.
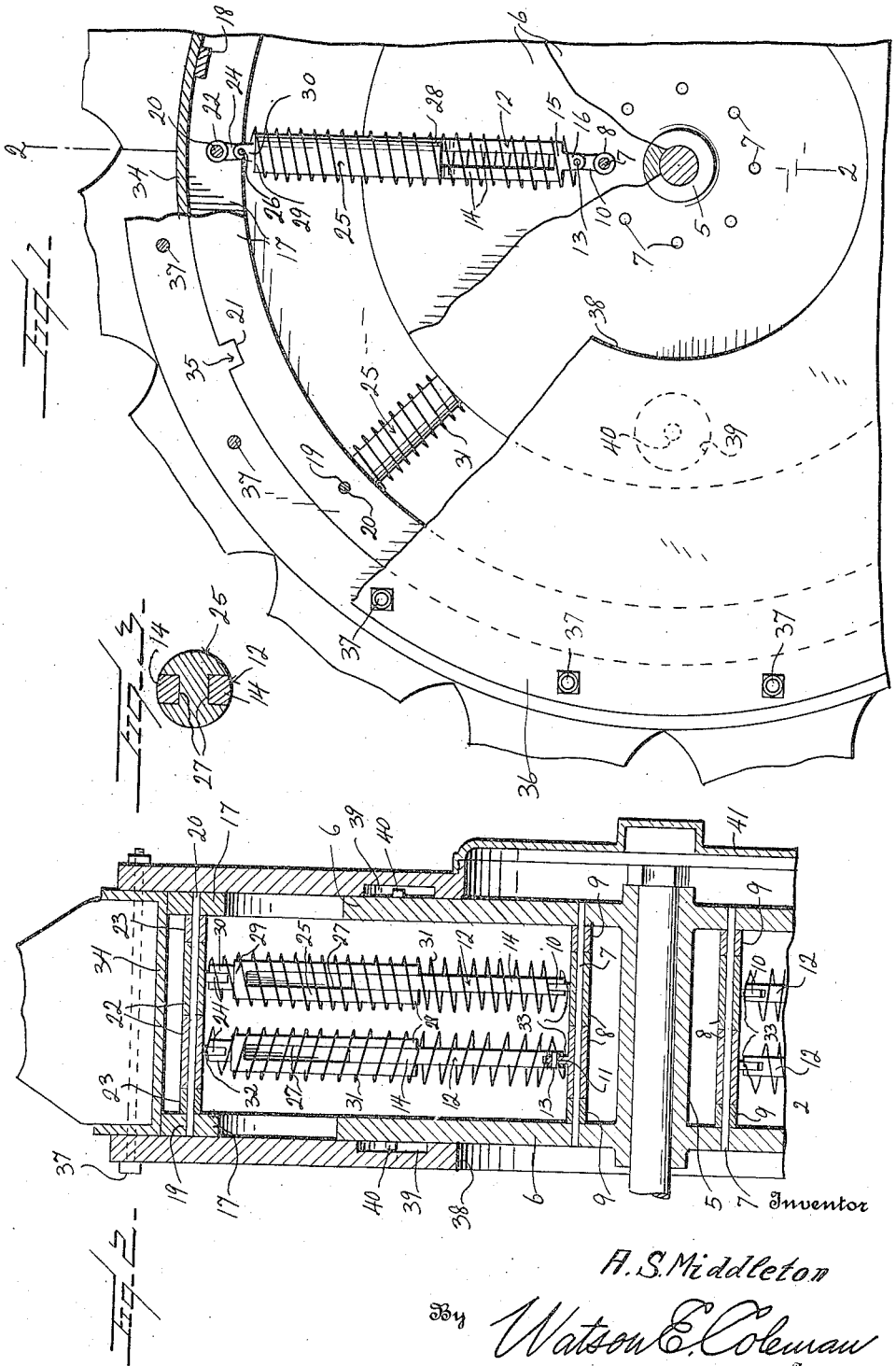

UNITED STATES PATENT OFFICE.

ALFRED S. MIDDLETON, OF DES MOINES, IOWA, ASSIGNOR OF ONE-HALF TO WALTER M. TOOLE, OF DES MOINES, IOWA.

SPRING-HUB.

1,348,437.  Specification of Letters Patent.  Patented Aug. 3, 1920.

Application filed November 19, 1919. Serial No. 339,140.

*To all whom it may concern:*

Be it known that I, ALFRED S. MIDDLETON, a citizen of the United States, residing at Des Moines, in the county of Polk and State of Iowa, have invented certain new and useful Improvements in Spring-Hubs, of which the following is a specification, reference being had to the accompanying drawings.

This invention relates to spring hubs and has for its object to provide an improved hub which is eccentrically movable with respect to the wheel.

Another object is the provision of a device of this character in which the main portion of the wheel is connected to the hub by means of springs which serve to cushion the wheel, and normally maintain the same concentric with its hub and permit yieldable movement of the latter.

Another object is the provision of a device of this character including a plurality of pins arranged to prevent buckling of the springs of the device, said pins being pivoted to sleeves which are self-adjusting in the eccentric movement of the hub.

With these and other objects in view, the invention consists in the improved construction and arrangement of parts to be hereinafter more particularly described, fully claimed and illustrated in the accompanying drawings, in which:

Figure 1 is a fragmentary side elevation with a portion of the device removed showing the interior mechanism.

Fig. 2 is a sectional view taken on the line 2—2 of Fig. 1.

Fig. 3 is a transverse sectional view of the slidably engaged pins.

Referring to the drawings, 5 indicates a hub including a pair of spaced annular flanges 6. Pivoted between the flanges 6 by means of the bolts 7, are sleeves 8, which are spaced from the flanges 6 by means of collars 9. Each sleeve includes an extension 10 having a pivot opening 11, to which a pin 12 is pivoted by means of the pin 13. This pin includes a pair of arms 14 extending in parallel relation to each other and formed integral at one end as at 15. The integral portion has an extension 16 by means of which the pin is connected to the extension 10. The purpose of the pin 12 will be hereinafter described.

An annular member consisting of a pair of rings 17 is connected by means of bars 18, and include a plurality of registering openings 19 adapted to receive the pivot bolts 20. Each ring 17 is provided with a plurality of recesses 21, the purpose of which will be hereinafter described.

Freely mounted on the bolts 10 of the annular member is a plurality of sleeves 22, which are spaced from the rings 17 by means of the collars 23. The sleeves 22 include extensions 24, to which pins 25 are pivoted by means of pivot pins 26. Each pin 25 comprises a cylindrical body portion having channels 27 in its diametrically opposite sides, the channels extending longitudinally of the pin and through the end 28 thereof. The end 29 of the pin is closed and includes an extension 30 which pivotally connects the pin to the extension 24. The arms 14 of the pin 12 are arranged to be slidably disposed in the channel 27 of the pin 25 and to lie flush with the outer surface of said pin.

A spring 31 surrounds each pair of the arms 12 and 25, and is connected at its end 32 with one of the sleeves 22, and at its end 33 with one of the sleeves 8, the slidably engaged pins serving to prevent buckling of the spring and to permit it to function properly.

An annular channel member 34 is engaged with the inner ends of the spokes of the wheel, and is provided with lugs 35 on the outer surface thereof adapted to be positioned in the recesses 21 of the rings 17, so as to maintain the annular member in the proper position. An annular plate 36 is secured to each side of the wheel and to the channel member 35 by means of the bolts 37. The plate 36 includes an enlarged central opening 38 through which the hub 5 extends, the opening being large enough to permit unlimited eccentric movement of the hub. The flange is also provided with a plurality of depressions 39 located adjacent its inner marginal edge. These depressions are intended to receive a plurality of lugs 40, projecting from the outer marginal edge of the flanges 6, and by this means an abnormal movement of the hub with respect to the wheel is prevented, so as to eliminate the possibility of the springs breaking and to prevent disengagement of the pins 12 and 25 from each other.

To prevent the entrance of dust and like matter a dust cap 41 is provided and secured to the outermost plate 36 over the central opening thereof. This cap does not interfere with the movement of the hub.

From the foregoing it will be readily seen that this device provides a novel spring hub which, in view of its universal connection to the wheel, will respond to any obstruction encountered in the course of travel, so that the use of pneumatic tires is not necessary.

In addition to this the novel arrangement of the flanges 6 in the plates 36 conceal the operating mechanism so as to render the device neat in appearance, and at the same time to protect the mechanism.

Furthermore in view of the movable sleeves 8 and 22 and the pins 25 and 12 do not bind in their expanding and contracting movement, as the sleeves adjust themselves to the position of the pins, which permit the proper function of the springs.

What is claimed to be new and useful is:

1. A device of the character described comprising a hub, a wheel having an annular member disposed in spaced relation to the hub, a plurality of pintles extending laterally of the annular member and hub, a plurality of sleeves mounted on each of said pintles for oscillating movement, a right angular lug projecting from each sleeve, a pin pivoted to each of said lugs, one of said pins being bifurcated longitudinally thereof, the other pin having two diametrically opposed longitudinal recesses in its outer surface, the arms of the bifurcated portion of the first mentioned pin being slidably disposed in said recesses and adapted to lie flush with the outer surface of the second mentioned pin, and a spring surrounding said pins, each end of the spring being secured to one of said pins.

2. A device of the character described comprising a hub, a wheel having an annular member disposed in annular spaced relation to the hub, a plurality of opposed pintles extending laterally of the annular member and the hub, a plurality of sleeves freely mounted on said pintles for oscillating movement, collars on the end portions of said pintles to prevent sliding movement of the sleeves, lugs projecting from said sleeves, pins pivoted at one of their ends to the lugs, the pins of the annular member and hub intersecting each other, and spring means surrounding said intersecting pins.

In testimony whereof I hereunto affix my signature.

ALFRED S. MIDDLETON.